May 7, 1963  C. W. MacMILLAN  3,088,547
VEHICLE RACK
Filed Nov. 2, 1961  2 Sheets-Sheet 1
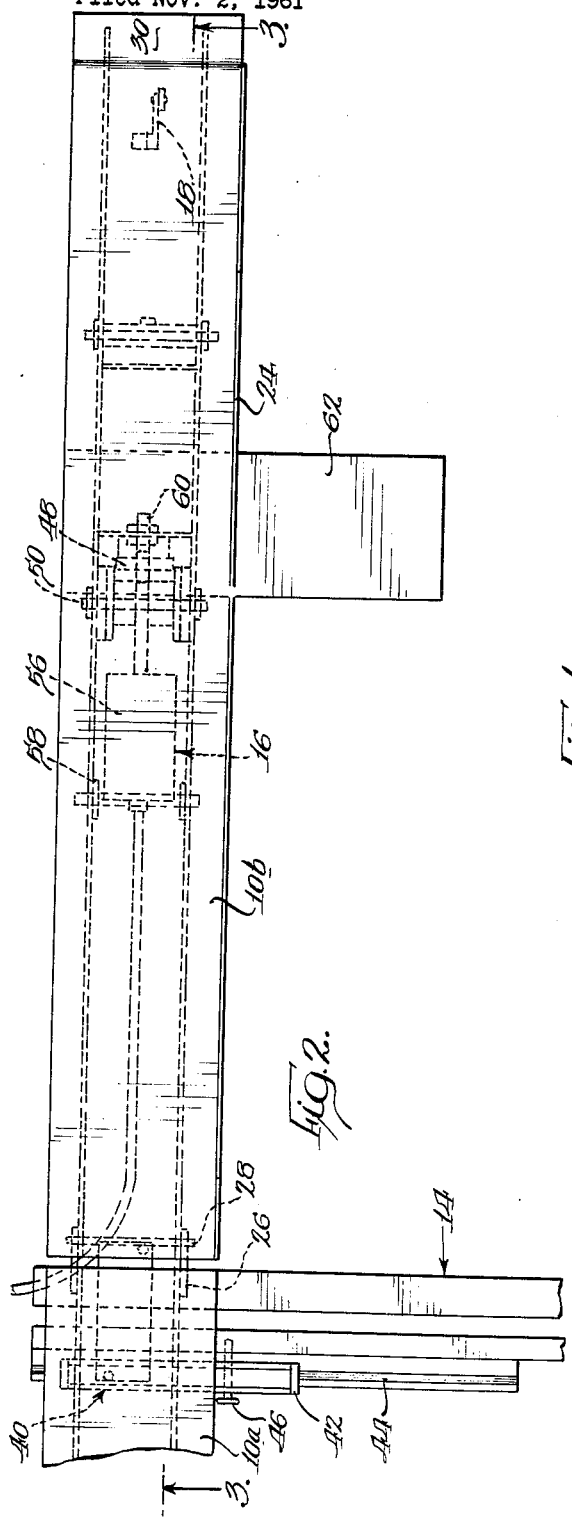
INVENTOR:
Charles W. MacMillan
BY
Gary, Desmond & Parker
Attys

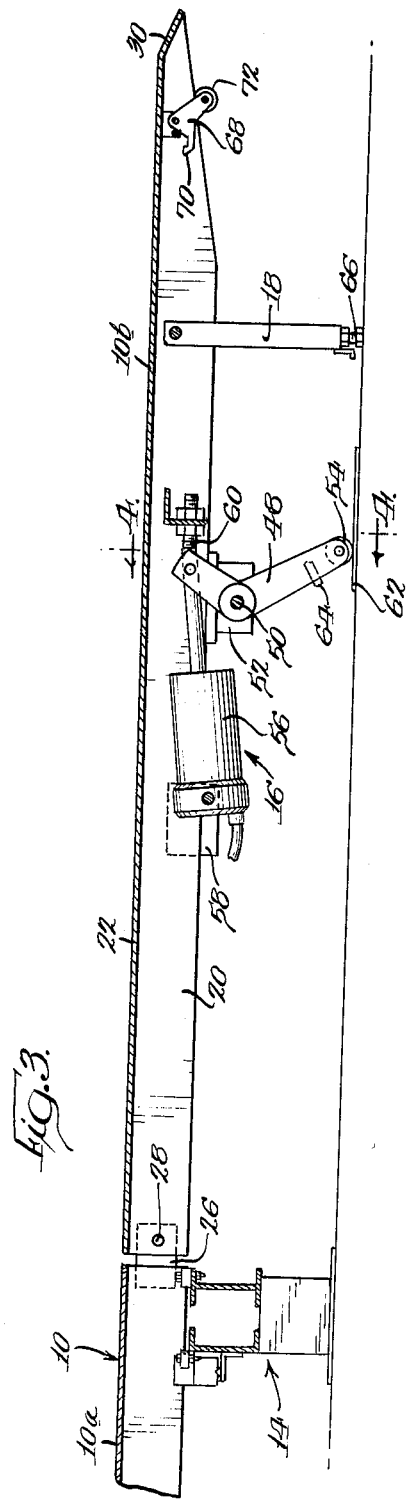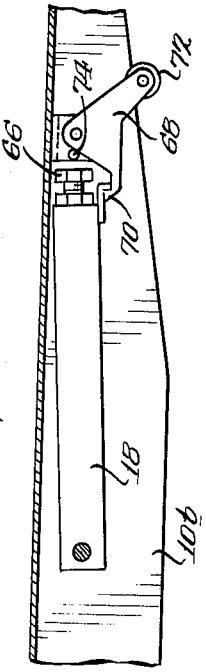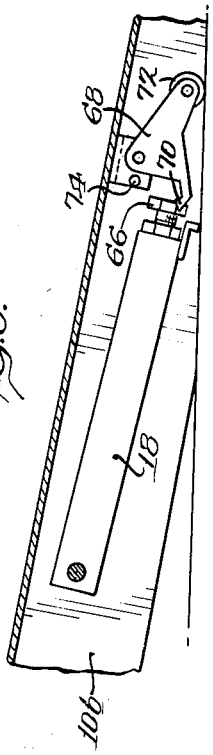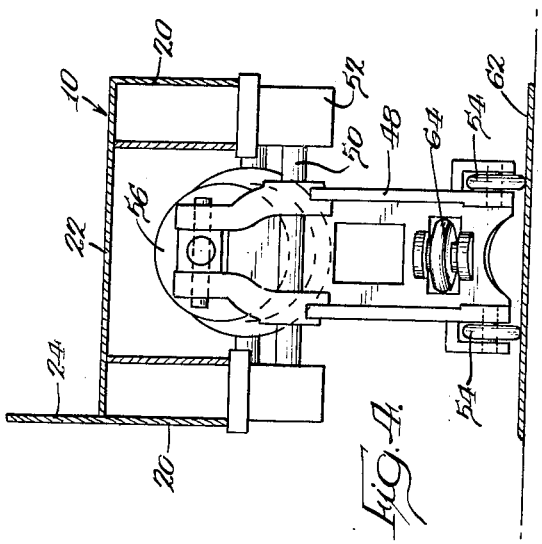

United States Patent Office 3,088,547
Patented May 7, 1963

3,088,547
VEHICLE RACK
Charles W. MacMillan, Rock Island, Ill., assignor to Bear Manufacturing Company, Rock Island, Ill., a corporation of Delaware
Filed Nov. 2, 1961, Ser. No. 149,765
3 Claims. (Cl. 187—8.71)

The present invention relates to service racks for vehicles, especially automobiles and trucks, and is directed particularly to an improved service rack of the type wherein the vehicle is driven up a ramp onto a platform spaced a short distance above ground or floor level.

In performing, for example, wheel alining, brake adjusting and tire rotation services on vehicles, the serviceman desires to have the vehicle at a convenient height above ground or floor level to facilitate access to the wheels, the brake components and the wheel suspensions. For wheel alining purposes particularly, the art has adopted a rack comprised of horizontal wheel runways spaced from one to three feet above floor level and adapted to support the vehicle in a horizontal plane as required for wheel alinement, and inclined ramps alined with the runways and accommodating movement of vehicles onto and off of the runways. Such racks have proven successful and are preferred for the purpose because of their fixed installation, low cost and safety, as compared for example to a vehicle lift.

Prior art service racks have, however, been subject to the particular criticisms that they are too long, take up too much space and do not fit into a standard car stall, i.e., the space normally alotted to a vehicle in a service station, garage, or dealership.

The object of the present invention is to provide an improved vehicle service rack of the defined character performing all the functions and affording all the advantages of prior art racks, and yet being of a size no larger than the size of the largest vehicle to be accommodated thereon, e.g., a standard size automobile.

Another object of the invention is to provide an improved vehicle rack facilitating not only wheel alinement services, but also brake, tire rotation and other wheel and wheel suspension services.

A specific object of the invention is the provision of an improved vehicle rack having a pair of runways of a length equal approximately to that of the longest vehicle to be accommodated, each runway being comprised of a pair of hingedly connected sections one of which is supported in an elevated horizontal position and the other of which is hingedly movable from an inclined position wherein it extends between the one section and ground or floor level and an elevated horizontal position where it is alined with the respective one section, whereby the hingedly movable section doubles as both ramp and runway. Thus, the whole rack is no longer or larger than the vehicle, affords the advantages of fixed installation, low cost and safety, and facilitates the driving of vehicles thereon followed by disposition of the vehicle in a horizontal plane as required particularly for wheel alinement services.

An additional object of the invention is incorporation in said rack of means for automatically raising and lowering the hinged ramp sections to facilitate the above described rack operation and also to facilitate elevation of the vehicle, insertion of vehicle supporting stands under the portion of the vehicle elevated by the ramp sections, and lowering of said sections whereby the wheels previously supported on said sections are freely suspended to facilitate servicing of the same.

It is also an object of the invention to incorporate safety stands directly in the hinged ramp sections in such manner that as the sections are raised the stands automatically swing into section supporting position, whereby the same eliminate the need for continued reliance on the section elevating means and impart to the rack the safety factor attributed to prior art racks.

A further object of the invention is to embody said safety stands compactly into the rack and to provide latch means therefor accommodating latched retention of the stands in retracted position to facilitate lowering of the hinged ramp sections and automatically releasing the stands in the inclined positions of said sections for automatic movement of said stands to safety position when said sections are again elevated.

A still further object of the invention is the provision of compact, efficient operating means for said hinged ramp sections comprising an operating lever embodied in each and a power actuated jack generally paralleling each section and coupled to the respective lever for swinging the same from a retracted position adjacent the section to an extended elevating position, both the lever and jack being disposed immediately beneath the lower surface of the section in an out-of-the-way protected position wherein the same will not interfere with servicing of the vehicle.

Other objects and advantages of the invention will become apparent in the following detailed description.

Now, in order to acquaint those skilled in the art with the manner of making and using my improved vehicle service rack, I shall describe, in connection with the accompanying drawings, a preferred embodiment of the rack and the preferred manners of making and using the same.

In the drawings:

FIGURE 1 is a perspective view of a preferred embodiment of the vehicle service rack of this invention;

FIGURE 2 is an enlarged fragmentary plan view of one of the hinged ramp sections of the rack;

FIGURE 3 is a longitudinal vertical sectional view of said hinged section, the view being taken substantially on line 3—3 of FIGURE 2;

FIGURE 4 is an enlarged transverse sectional view of said section particularly showing the section raising and lowering means, the view being taken substantially on line 4—4 of FIGURE 3; and FIGURES 5 and 6 are fragmentary longitudinal sectional views of the hinged section showing the section safety stand respectively in its retracted latched position and in the position the same assumes in the inclined or ramp position of the section.

Referring now to the drawings, and particularly to FIGURES 1 and 3, the vehicle service rack of my invention is shown in its preferred embodiment as being comprised of two spaced parallel coextensive runways 10 and 12 each consisting of two hingedly connected sections, namely, a fixed section 10a and 12a, respectively, and a hinged ramp section 10b and 12b, respectively, connected to the fixed section for pivotal movement in a vertical plane; a rigid support or stand 14 for supporting the fixed runway sections 10a and 12a in a horizontal plane elevated above floor or ground level; means 16 for raising and lowering the hinged sections 10b and 12b to dispose the same selectively in the inclined position of FIGURES 1 and 6 and in the elevated horizontal position of FIGURE 3; and safety stand means 18 for supporting the sections 10b and 12b in their elevated horizontal positions.

The sections of the runways 10 and 12 each preferably comprise (as shown in FIGURE 4) a pair of spaced parallel box-beams 20 bridged by a flat horizontal plate 22 defining the runway surface, and an upwardly extending guide plate 24 on the inner edge of the section for guiding the wheels of the vehicle as the vehicle is moved onto and off of the rack to maintain the vehicle alined with the rack. The two sections of each runway are hingedly connected by hinged plates 26 secured to the beams 20 of the fixed section and a pivot pin 28 extending horizontally and transversely through the plate and the adjacent end portions of the movable section. The latter section at its opposite end includes an inclined approach ramp or flipper plate 30 facilitating movement of the wheels of the vehicle onto the runway. The fixed sections adjacent their opposite ends include depressed areas within which outwardly projecting drop pans 32 are secured to accommodate reception of the turning radius gauges (not shown) conventionally used in wheel alinement procedures. At their free or head ends, the fixed sections 10a and 12a are provided with wheel abutments or safety stops 34 to prevent movement of vehicles off the rack.

Each of the runways 10 and 12 is preferably of an overall length approximately the same as that of the longest vehicle to be accommodated on the rack (e.g., the length of U.S. manufactured automobiles of standard size), or at least of a length somewhat greater than the longest wheel base of the vehicles to be accommodated.

The support or stand 14 for the fixed sections 10a and 12a is comprised of two standards each consisting of a pair of laterally spaced upright legs 36 and a transverse beam 38 extending horizontally over and beyond the legs. Each leg at its lower end includes horizontal flanges whereby the legs may be bolted to the wooden or concrete deck of a building, garage or service station; no foundation or footing being required. Each beam 38 is preferably of a length equal to the width of the widest vehicle to be accommodated, or at least equal to the widest tread width of such vehicles.

In order to accommodate vehicles having various tread widths, at least one (and if desired both) of the fixed sections 10a and 12a is slidably mounted on the beams 38 for transverse adjustment of the sections relative to one another. Specifically, as shown for the section 10a in FIGURES 2 and 3, the section may carry a pair of roller assemblies 40 which slidably engage flange portions of the beams 38 to accommodate movement of the section transversely of its length on the beams, the two beams maintaining the section in spaced parallel relation to the other section. Preferably, guides 42 on the section 10a rest slidably on ways 44 paralleling the beams 38, and a lock pin 46 extends through each guide for selective entry into a series of holes in the beams for locking the section 10a in transversely adjusted position. In the illustrated embodiment, only the runway 10 is adjustable, and the section 12a of the other runway has a fixed mounting on the beams 38 at the outboard ends thereof. In this manner, all vehicle widths are readily accommodated on the one rack.

As to overall size, the preferred embodiment of the invention has a length of about sixteen feet, a width of about eight feet, and a height of about two feet, whereby the same is smaller than and readily fits within a standard car stall in garages, etc. It is also preferred that each runway have the hinge thereof substantially at its midpoint, whereby the sections 10a, 10b, 12a and 12b are each about eight feet long to facilitate shipment of the rack in knocked-down condition, to facilitate assembly of the rack on the job site and to cause the sections 10b and 12b to define gently sloping ramps facilitating driving of vehicles, even low-slung sports models, onto and off of the rack. Specifically, the ramps have an inclination of only about 14 to 15 degrees and the juncture between the hinged and fixed sections is not sharp or pronounced.

When the vehicle has been driven onto the rack, it is necessary to elevate the ramp sections 10b and 12b to dispose the vehicle horizontal, especially when performing wheel alinement services. For this purpose the means 16 is provided, and as will be apparent to those skilled in the art, said means may take a variety of known forms. However, for the preferred embodiment of this invention, I have devised a novel raising and lowering assembly and associate one such assembly with each of the ramp sections 10b and 12b. As shown particularly in FIGURES 3 and 4, each such assembly includes a ramp operating member comprising a bell crank lever 48 pivotally mounted on a shaft 50 which is supported adjacent the middle of the respective section in a transverse horizontal position by a pair of bearing blocks 52 which engage the opposite ends of the shaft and are secured to the lower surface of the respective ones of the box-beams 20 of the section. The bell crank 48 comprises a relatively long ground engaging lever equipped with ground engaging wheels or rollers 54 at its outer end, and a relatively short input lever, the crank being pivotally movable in a vertical plane from a position wherein the long lever arm is adjacent the section and substantially parallel thereto to the position of FIGURES 3 and 4 wherein the long lever arm assumes a generally upright position transverse to the section.

To operate the bell crank 48, a jack 56 in the form preferably of a reciprocable pneumatic motor is mounted on the respective section 10b or 12b; the cylinder of the motor being pivotally mounted on the section by trunnions engaging in spaced bearings 58 and the piston rod of the motor being pivotally connected to the short input lever arm of the bell crank. Because of this arrangement, the short powerful stroke of the jack will produce relatively great movement of the rollers 54 in the vertical direction, whereby the assembly will readily effect the necessary vertical movement of the ramp section. Preferably, an adjustable piston stop 60 is mounted on the lower surface of the section to limit (or to accommodate variation in) the stroke of the piston and thereby limit the degree of elevation of the ramp section.

In the complete assembly, the bell crank lever 48, the jack 56 and the stop 60 are located immediately below and entirely within the horizontal confines of the respective section 10b and 12b, whereby the same are protected from damage by the section and are located out of the way of the servicemen who will work on vehicles supported on the rack.

The fluid operated motors comprising the jacks 56 are connected via a valve or valve system (not shown) to a source of air under pressure, which valve or system is devised for controlling admittance and discharge of air under pressure at selected rates, whereby the jacks may be operated both to elevate and lower the ramp sections at controlled rates of speed. In a preferred embodiment, the valve or valve system will accommodate simultaneous operation of both jacks and independent operation of each jack, thereby to facilitate optimum use of the rack. Valves for performing the stated functions are, of course, well known in the art.

The rollers or wheels 54 serve particularly to reduce frictional resistance to movement of the bell crank lever 48 and assure smooth performance by the pneumatic jack 56 of the functions of raising and lowering the ramp section. I prefer to provide a bearing plate 62 to be laid on the floor or deck beneath the rollers 54 further to assure this result, and also to prevent damage to the deck of the building which would impair operation of the rack.

In the case of the transversely movable runway 10, the plate 62 is of a transverse dimension somewhat greater than the path of movement of the runway, whereby the plate need not be moved each time the tread width of the rack is adjusted. In addition, to facilitate transverse adjustment of the movable runway, I prefer to include in the long lever arm of the respective bell crank 48 a secondary roller or wheel 64 which is disposed transversely of the rack and is mounted for rotation on a shaft coincident with the longitudinal axis of said long lever arm. In the retracted position of the bell crank, the roller or wheel 64 engages, or is disposed for engagement with, the plate 62. By slight extension of the piston rod of the jack, this roller or wheel is engaged with the plate and the ramp section 10b is caused to be supported on the wheel, whereby there will be little frictional resistance to transverse movement of the runway and adjustments thereof are facilitated.

Once the ramp sections 10b and 12b have been raised, I prefer to support the same by safety stands so that the ramp sections will not fall down or let a car down in the event of a failure in air pressure, or a defect or physical failure in the air pressure system. I also prefer as part of this safety feature that such stands automatically move into ramp supporting position whenever the ramp sections are raised, whereby safety precautions cannot be ignored or forgotten by personnel. To this end, I incorporate in each section 10b and 12b adjacent the free end thereof the safety stand 18. Such stand, as shown particularly in FIGURES 3, 5 and 6, simply comprises a lever pivotally mounted at one end on the lower surface of the section for free swinging gravitational movement whenever the ramp section is raised. In this manner, when the ramp is raised, the lever automatically swings into the vertically depending, ramp supporting position of FIGURE 5. Preferably, the respective stop 60 on each section is adjusted so that the free end of the ramp moves above the plane of the fixed sections 10a and 12a, whereby the stand 18 may swing into its vertical supporting position, after which air pressure can be released from the jack to cause the stand to engage the ground and to cause the ramp to be supported on the stand. To insure that the ramp will be horizontal in the latter position, an adjustable foot 66 is provided on the lower end of each stand 18.

When it is desired that the ramp sections 10b and 12b be lowered, it is of course necessary that the safety stands 18 be moved out of the way. To facilitate retention of each stand in a non-interferring retracted position, I provide a latch 68 adjacent the free end of each of the ramp sections. Each latch preferably comprises a bell crank having a short lever arm terminating in a latch hook 70 and a long lever arm extending toward the free end of the section. The weight of this latter arm is preferably increased by provision of an anti-friction roller 72. Because of the overbalancing weight of the long arm and its roller, the short arm is normally urged into the path of pivotal movement of the lever comprising the safety stand 18, the degree of extension of the hook into the path of the stand being limited by a stop pin 74. Consequently, if the stand in the elevated position of the ramp is swung upwardly, the free or outer end thereof will engage the inclined lower surface of the latch hook 70 and swing the latch rearwardly out of the way, whereafter the latch will swing back bringing the hook 70 under the lever 18 to retain the lever in position adjacent the lower surface of the respective ramp section so that the section may be lowered.

As each ramp section is lowered, and its outer free end approaches ground level, the roller 72 on the latch 68 engages the ground and is swung upwardly relatively to the ramp section, causing the latch hook 70 to be swung downwardly and rearwardly away from the lever 18 until finally the hook clears and releases the lever, as shown in FIGURE 6, whereby the safety stand is automatically conditioned for automatic movement to ramp supporting position upon occurrence of the next ramp elevating cycle.

In use of the rack, a serviceman may drive a vehicle front end first up to the rack and aline the left-hand wheels of the vehicle with the left-hand stationary runway 12. With the car in this position, the right runway 10 can quickly and easily be adjusted in the transverse direction to the exact tread width of the vehicle, whereupon the vehicle may be driven up the gentle slope of the ramp sections 10b and 12b until its front wheels come to rest on the turning radius plates supported on the drop pans 32 on the sections 10a and 12a. The vehicle brakes are then set, and if desired wheel blocks may be placed to opposite sides of one or both of the rear wheels. The serviceman may then leave the vehicle to go to the control valve or system for the pneumatic jacks 56 and admit air to the same, thus causing the ramp sections 10b and 12b to be swung upwardly about their hinges 26—28 until the rear or free end of the ramp sections are somewhat above the horizontal plane of the fixed sections 10a and 12a. The final limit of movement will of course be determined automatically by the stops 60, which may be adjusted as desired to effect the proper elevation of the ramp sections.

As the ramp sections are swung upwardly, the safety stands 18 are automatically moved toward vertical position in that the outer ends thereof slide on the ground while the inner ends thereof are raised upwardly with the ramps. Since the stands are of a length to support the ramp sections 10b and 12b in horizontal alinement with the fixed sections 10a and 12a, respectively, and the ramps are swung somewhat above that level, the stands 16 will swing fully to vertical position.

When the ramp sections have been swung upwardly to the full extent of movement accommodated by the stops 60, the serviceman may simply release the air from the jacks 56, whereupon the ramp sections will be lowered until they are fully supported in horizontal position by the stands 18.

In the latter position of the vehicle, the serviceman may proceed directly with performance of wheel alinement functions, all as well known in the art. As part of his wheel alinement equipment, the serviceman will have at his disposal a jack that is mounted on the front crossbeam 38 of the stand 14, whereby he may utilize this jack to elevate the front of the car to remove the wheels to work on the brakes, or to work on the wheel suspensions. The approximate three to three and one-half foot elevation above floor level of the wheel axes by the rack of this invention particularly facilitates such work.

To accommodate removal of the rear wheels and to gain access to the rear brakes, the serviceman need only place a vehicle supporting stand under a suitable portion of the vehicle undercarriage and lower the ramp sections 10b and 12b. Also, for transmission and differential work, a serviceman may place a vehicle supporting stand under the rear portions of the vehicle frame, uncouple the rear axle suspension and lower the rear axle and wheels by simply lowering the ramp sections. Thus, a wide variety of service operations are facilitated by my improved vehicle rack.

To lower either or both of the ramp sections 10b and 12b for any of the above stated reasons, and to accommodate removal of the vehicle from the rack, the serviceman simply manipulates the air valve means to elevate the ramp sections to their full limit of movement, swings the safety stand on the selected ramp or on both ramps upwardly to the latched position of FIGURE 5, and operates the air valve means to release air at a controlled rate from the jacks. As air is released, the weight of each ramp section, or the combined weight of each ramp section and the vehicle or vehicle parts thereon will cause each ramp section to gravitate downwardly until the free rearward end thereof contacts the ground or floor. In view of this operation of the ramps, it is of course apparent that the jacks may constitute single-acting air motors. As each ramp section approaches its at-rest position wherein its rearward end engages the ground, the latches 68 are released, whereby the safety stands 18 are again conditioned for the automatic operation above described.

The manner of installation and adjustment of the rack will of course be obvious to those skilled in the art from the above, and specific description is thus unnecessary.

From the foregoing, it should now be apparent that all of the objects and advantages of my invention have been shown herein to be attained in a convenient, economical and practical manner.

While I have shown and described what I regard to be the preferred embodiment of my invention, it will be appreciated that various changes, rearrangements and modifications may be made therein without departing from the scope of the invention, as defined by the appended claims.

I claim:

1. A vehicle rack comprising a pair of spaced parallel coextensive runways each of a length about the same as that of a vehicle and each comprised of a pair of hingedly connected runway sections of approximately the same length, a stand beneath corresponding ones of the sections of the runway supporting the same in elevated horizontal position, said stand supporting one of said runways for transverse movement to accommodate adjustment in the tread width of the rack, the free end portions of the other sections of the runways being hingedly movable from a position adjacent ground level wherein said other sections are inclined between said one sections and ground level to an elevated horizontal position wherein said other sections are alined with said one sections, said other sections being of a length to form in their inclined positions a loading ramp accommodating movement of one end of the vehicle upwardly onto said one sections, a lever pivotally mounted on a transverse axis of said other sections for movement from a retracted position adjacent the section to an extended generally upright position, the lever on said one runway including a wheel generally paralleling said stand and engaging the ground in said retracted position to facilitate transverse movement of said one runway, a jack mounted on each of said other sections generally parallel thereto and coupled to the respective lever for swinging the same from said retracted position to said upright position for moving the section from an inclined position to an elevated position, and means for operating said jacks conjointly with one another and independently of one another.

2. A vehicle rack comprising a pair of spaced parallel coextensive runways each of a length greater than the longest wheel base of vehicles to be accommodated thereon and each comprised of a pair of hingedly connected runway sections of approximately the same length, a stand beneath corresponding ones of the sections of the runways supporting the same in elevated horizontal position above ground level, the free end portions of the other sections of the runways being hingedly movable from a position adjacent ground level wherein said other sections are inclined between said one sections and ground level to an elevated horizontal position wherein said other sections are alined generally with said one sections, and conjointly and independently operable means mounted on each of said other sections for raising the free end portion of the respective other section to elevate said other sections and the other end of the vehicle and dispose the vehicle in an elevated horizontal position, for lowering said other sections to accommodate movement of the vehicle off the rack and for independent lowering and raising of each of said other sections to accommodate free suspension of the vehicle wheel.

3. A vehicle rack comprising a pair of spaced parallel coextensive runways each of a length greater than the longest wheel base of vehicles to be accommodated thereon and each comprised of a pair of hingedly connected runway sections of approximately the same lengths, a stand beneath corresponding ones of the sections of the runways supporting the same in elevated horizontal position above ground level, said stand supporting at least one of said runways for transverse movement to accommodate adjustment in the tread width of the rack to the extremes of the vehicles to be accommodated thereon, the free end portions of the other sections of the runways being hingedly movable from a position adjacent ground level wherein said other sections are inclined between said one sections and ground level to an elevated horizontal position wherein said other sections are alined with said one sections, a lever pivotally mounted on a transverse horizontal axis of the lower side of each of said other sections intermediate the ends thereof, each lever being movable from a retracted position adjacent the respective section to an extended generally upright position, the lever on at least said one runway including a wheel generally paralleling said stand and engaging the ground in said retracted position when the respective other section is in its inclined position to facilitate transverse movement of said one runway, a jack mounted on each of said other sections generally parallel thereto and coupled to the respective lever for swinging the same from said retracted position to said upright position for moving the section from its inclined position to an elevated position wherein the free end portion of the section is elevated slightly above the horizontal plane of the respective one section, means for operating said jacks conjointly with one another and independently of one another, a safety stand pivotally mounted adjacent the free end of each of said other sections for movement from a retracted out-of-the-way position adjacent the section to a generally upright position for supporting the free end of the respective section in a position alined horizontally with the respective one section, movement of the free end of said other sections above the plane of said one sections accommodating swinging movement of said safety stands into and out of their upright positions, and latch means on each of said other sections adjacent the respective safety stands and normally urged toward latching position, said safety stands being swingable from their upright positions to their retracted positions to engage the same with said latches and latch the same in retracted position and thereby accommodate lowering of the free end portions of said other sections by said jacks, each of said latches including a release portion engageable with the ground in the inclined position of said other sections to release the said latches from said safety stands, whereby said safety stands are conditioned for free swinging movement to upright positions when said other sections are again raised.

References Cited in the file of this patent

UNITED STATES PATENTS

| | | |
|---|---|---|
| 982,977 | Morgan | Jan. 31, 1911 |
| 1,538,437 | Larsen | May 19, 1925 |
| 1,844,584 | Manley | Feb. 9, 1932 |
| 1,862,682 | Judd | June 14, 1932 |
| 1,901,103 | Judd | Mar. 14, 1933 |
| 2,045,109 | Smith | June 23, 1936 |
| 2,456,646 | Patterson | Dec. 21, 1948 |
| 2,576,544 | Smith | Nov. 27, 1951 |
| 2,892,513 | Carrigan | June 30, 1959 |
| 2,962,980 | Carrigan | Dec. 6, 1960 |